(12) United States Patent
Yang et al.

(10) Patent No.: US 11,294,953 B2
(45) Date of Patent: Apr. 5, 2022

(54) SIMILAR FACE RETRIEVAL METHOD, DEVICE AND STORAGE MEDIUM

(71) Applicant: BEIJING DAJIA INTERNET INFORMATION TECHNOLOGY CO., LTD., Beijing (CN)

(72) Inventors: Fan Yang, Beijing (CN); Yan Li, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 27 days.

(21) Appl. No.: 16/832,050

(22) Filed: Mar. 27, 2020

(65) Prior Publication Data

US 2020/0250226 A1    Aug. 6, 2020

(30) Foreign Application Priority Data

Mar. 28, 2019  (CN) .......................... 201910243259.1

(51) Int. Cl.
*G06F 16/00* (2019.01)
*G06F 16/583* (2019.01)
(Continued)

(52) U.S. Cl.
CPC ..... *G06F 16/5854* (2019.01); *G06K 9/00268* (2013.01); *G06K 9/42* (2013.01);
(Continued)

(58) Field of Classification Search
CPC .. G06F 16/5854; G06K 9/00268; G06K 9/42; G06K 9/46; G06K 9/6215; G06K 9/6256; G06K 9/6263; G06K 9/627; G06N 3/08
See application file for complete search history.

(56) References Cited

U.S. PATENT DOCUMENTS 10,872,258 B2 * 12/2020 Ghobadzadeh ...... G06K 9/6217
2018/0082110 A1    3/2018 Myers et al.
(Continued)

FOREIGN PATENT DOCUMENTS

| CN | 105512638 A | 4/2016 |
|---|---|---|
| CN | 109344740 A | 2/2019 |
| CN | 109522436 A | 3/2019 |

OTHER PUBLICATIONS

Wang et al, Learning fine-granted image similarity with deep ranking, Proc. CVPR, 2014, pp. 1-8 (Year: 2014).*
(Continued)

*Primary Examiner* — Ping Y Hsieh
*Assistant Examiner* — Xiao Liu
(74) *Attorney, Agent, or Firm* — Meunier Carlin & Curfman LLC

(57) ABSTRACT

A similar face retrieval method and device and a storage medium are provided. The method includes: acquiring a face image to be retrieved; performing feature extraction on the face image to be retrieved based on a feature extraction model, and taking an output result of an antepenultimate layer of the feature extraction model as a first similar face feature of the face image to be retrieved; for each face image in a face database, acquiring the distance in feature space between the first similar face feature and a second similar face feature of each face image; and according to the obtained distance information, retrieving a target face image with the highest similarity to the face image to be retrieved in the face database.

14 Claims, 9 Drawing Sheets

(51) Int. Cl.
*G06K 9/00* (2022.01)
*G06K 9/62* (2022.01)
*G06K 9/46* (2006.01)
*G06N 3/08* (2006.01)
*G06K 9/42* (2006.01)

(52) U.S. Cl.
CPC .............. *G06K 9/46* (2013.01); *G06K 9/627* (2013.01); *G06K 9/6215* (2013.01); *G06K 9/6256* (2013.01); *G06K 9/6263* (2013.01); *G06N 3/08* (2013.01)

(56) References Cited

U.S. PATENT DOCUMENTS

2018/0260415 A1* 9/2018 Gordo Soldevila .. G06F 16/583
2020/0285896 A1* 9/2020 Huang ................. G06K 9/6235

OTHER PUBLICATIONS

Li et al, Fast face image retrieval based on depth feature, Acta Optica Sinica, vol. 38, No. 10, Oct. 31, 2018, pp. 1010004-1-1010004-7 (Year: 2018).*
Schroff et al, FaceNet: A united embedding for face recognition and clustering, Proc. CVPR, 2015, pp. 815-823 (Year: 2015).*
Xu Xiao-ma, Multiview face retrieval in surveillance video by active training sample collection, CPS, 2014 Tenth International Conference on Computational Intelligence and Security, pp. 242-246.
Li Zhendong, Fast Face Image Retrieval Based on Depth Feature, Acta Optica Sinica, vol. 38, No. 10, Oct. 31, 2018, pp. 1010004-1-101004-7. English Abstract included in text.

* cited by examiner

| Input size | Output size | Structure |
| --- | --- | --- |
| 128x128x3 | 128x128x32 | conv_3 |
| 128x128x32 | 128x128x64 | conv_3 |
| 128x128x64 | 64x64x64 | max_pooling_2 |
| 64x64x64 | 64x64x64 | resblock_3 |
| 64x64x64 | 64x64x128 | conv_3 |
| 64x64x128 | 32x32x128 | max_pooling_2 |
| 32x32x128 | 32x32x128 | {resblock_3}x2 |
| 32x32x128 | 32x32x256 | conv_3 |
| 32x32x256 | 16x16x256 | max_pooling_2 |
| 16x16x256 | 16x16x256 | {resblock_3}x5 |
| 16x16x256 | 16x16x512 | conv_3 |
| 16x16x512 | 8x8x512 | max_pooling_2 |
| 8x8x512 | 8x8x512 | {resblock_3}x5 |
| 8x8x512 | 8x8x1024 | conv_3 |
| 8x8x1024 | 4x4x1024 | max_pooling_2 |
| 4x4x1024 | 4x4x1024 | {resblock_3}x3 |
| 4x4x1024 | 1024 | fc_1024 |

Fig. 4

--Prior Art--

SIMILAR FACE RETRIEVAL METHOD, DEVICE AND STORAGE MEDIUM

CROSS-REFERENCE TO RELATED APPLICATION

This application claims priority to Chinese Patent Application No. 201910243259.1, filed on Mar. 28, 2019, which is hereby incorporated by reference in its entirety.

FIELD

The disclosure relates to the field of deep learning, in particular to a similar face retrieval method and device and a storage medium.

BACKGROUND

A face retrieval technology is a new biometric technology which combines computer image processing knowledge with biostatistics knowledge, and has broad application prospects at present. For example, the face retrieval technology can be used for each user to find other users who have similar appearance to the user, i.e., find another "him/her" in the world. Since this technology brings users a brand-new experience, it can greatly improve the activeness of the users.

The higher the similarity between a retrieved similar face and an inquiring user, the higher the satisfaction degree of the user, and accordingly the retrieval results conform to the expectation of the user more.

Therefore, how to perform similar face retrieval to improve the retrieval accuracy has become an urgent problem for those skilled in the art.

SUMMARY

The disclosure provides a similar face retrieval method and device and a storage medium.

According to a first aspect of the embodiments of the present disclosure, a similar face retrieval method is provided. The method includes: acquiring a face image to be retrieved; performing feature extraction on the face image to be retrieved based on a feature extraction model, and taking an output result of an antepenultimate layer of the feature extraction model as a first similar face feature of the face image to be retrieved, where the feature extraction model is obtained after optimizing a trained initial model based on a triplet loss function; for each face image in a face database, acquiring a distance in feature space between the first similar face feature and a second similar face feature of each face image, where the second similar face feature is obtained after feature extraction of each face image based on the feature extraction model; and according to the obtained distance, retrieving a target face image with the highest similarity to the face image to be retrieved in the face database.

In some embodiments, training processes of the feature extraction model includes: acquiring first training sample images marked with classification information, and preprocessing the first training sample images; performing model training according to the preprocessed first training sample images till model convergence to obtain an initial model; optimizing the initial model by means of a stochastic gradient descent algorithm to obtain the trained initial model; and optimizing the trained initial model based on the triplet loss function to obtain the feature extraction model.

In some embodiments, the optimizing the trained initial model based on the triplet loss function includes: acquiring second training sample images; for an anchor face image in the second training sample images, based on the trained initial model, performing similar face retrieval in third training sample images to obtain two face images with similarity ranked in the top two, where the anchor face image is any one face image in the second training sample images; determining a positive sample and a negative sample in the obtained two face images, where a similarity between the positive sample and the anchor face image is higher than a similarity between the negative sample and the anchor face image; acquiring similar face features of all sample triplets based on the trained initial model, where each sample triplet comprises an anchor face image, and a positive sample and a negative sample of the anchor face image; and according to the obtained similar face features of the sample triplets, constructing the triplet loss function, and optimizing the triplet loss function by means of a stochastic gradient descent algorithm till convergence.

In some embodiments, the convergence condition of the triplet loss function is that a first distance is smaller than a second distance.

The first distance refers to the distance in feature space between the similar face feature of the anchor face image and the similar face feature of the positive sample in the same sample triplet, and the second distance refers to the distance in feature space between the similar face features of the anchor face image and the similar face feature of the negative sample.

In some embodiments, the expression of the triplet loss function is:

$$loss = \max(0, \|f(x_a^i) - f(x_p^i)\|_2^2 + \text{margin} - \|f(x_a^i) - f(x_n^i)\|_2^2).$$

Where loss refers to the triplet loss function, $\|f(x_a^i) - f(x_p^i)\|_2^2$ refers to the Euclidean distance between the similar face feature of the anchor face image and the similar face feature of the positive sample in the same sample triplet, $\|f(x_a^i) - f(x_p^i)\|_2^2$ refers to the Euclidean distance between the similar face feature of the anchor face image and the similar face feature of the negative sample in the same sample triplet, margin refers to the fixed minimum interval, and i is a positive integer.

In some embodiments, the performing model training according to the preprocessed first training sample images till model convergence to obtain the initial model includes: inputting the preprocessed first training sample images into a convolutional neural network with a cross entropy loss function to obtain a predicted classification result of the first training sample images output by the convolutional neural network; determining whether a marked classification result of the first training sample images is consistent with the predicted classification result based on the cross entropy loss function; and when the marked classification result is inconsistent with the predicted classification result, iteratively updating a weight value in the convolutional neural network till the marked classification result is consistent with the predicted classification result.

In some embodiments, the performing feature extraction on the face image to be retrieved based on the feature extraction model includes: preprocessing the face image to be retrieved, where the preprocessing comprises at least clipping processing and alignment processing; and performing feature extraction on the preprocessed face image to be retrieved based on the feature extraction model.

According to a second aspect of the embodiments of the present disclosure, a similar face retrieval device is provided and includes: a first acquiring unit, an extracting unit, a second acquiring unit, and a retrieving unit.

The first acquiring unit is configured to acquire a face image to be retrieved.

The extracting unit is configured to perform feature extraction on the face image to be retrieved based on the feature extraction model, and take an output result of an antepenultimate layer of the feature extraction model as a first similar face feature of the face image to be retrieved, where the feature extraction model is obtained after optimizing the trained initial model based on the triplet loss function.

The second acquiring unit is configured to, for each face image in the face database, acquire the distance in feature space between the first similar face feature and the second similar face feature of each face image, where the second similar face feature is obtained after feature extraction of each face image based on the feature extraction model.

The retrieving unit is configured to, according to the obtained distance, retrieve a target face image with a highest similarity to the face image to be retrieved in the face database.

In some embodiments, the device further includes: a third acquiring unit, a preprocessing unit, a training unit, a first optimizing unit, and a second optimizing unit.

The third acquiring unit is configured to acquire the first training sample images marked with the classification information.

The preprocessing unit is configured to preprocess the first training sample images.

The training unit is configured to perform model training according to the preprocessed first training sample images till model convergence to obtain an initial model.

The first optimizing unit is configured to optimize the initial model by means of a stochastic gradient descent algorithm to obtain the trained initial model.

The second optimizing unit is configured to optimize the trained initial model based on the triplet loss function to obtain the feature extraction model.

In some embodiments, the second optimizing unit includes: a first acquiring subunit, a retrieving subunit, a determining subunit, a second acquiring subunit, and a constructing subunit.

The first acquiring subunit is configured to acquire the second training sample images.

The retrieving subunit is configured to, for the anchor face image in the second training sample images, based on the trained initial model, perform similar face retrieval in third training sample images to obtain two face images with the similarity ranked in the top two, where the anchor face image is any one face image in the second training sample images.

The determining subunit is configured to determine the positive sample and the negative sample in the two face images, where the similarity between the positive sample and the anchor face image is higher than the similarity between the negative sample and the anchor face image.

The second acquiring subunit is configured to acquire the similar face features of all the sample triplets based on the trained initial model, where each sample triplet includes an anchor face image, and a positive sample and a negative sample of the anchor face image.

The constructing subunit is configured to, according to the obtained similar face features of the sample triplets, construct the triplet loss function, and optimize the triplet loss function by means of the stochastic gradient descent algorithm till convergence.

In some embodiments, the convergence condition of the triplet loss function is that the first distance is smaller than the second distance.

The first distance refers to the distance in feature space between the similar face feature of the anchor face image and the similar face feature of the positive sample in the same sample triplet, and the second distance refers to the distance in feature space between the similar face feature of the anchor face image and the similar face feature of the negative sample.

In some embodiments, the expression of the triplet loss function is:

$$loss=\max(0,\|f(x_a^i)-f(x_p^i)\|_2^2+margin-\|f(x_a^i)-f(x_n^i)\|_2^2).$$

Where loss refers to the triplet loss function, $\|f(x_a^i)-f(x_p^i)\|_2^2$ refers to the Euclidean distance between the similar face feature of the anchor face image and the similar face feature of the positive sample in the same sample triplet, $\|f(x_a^i)-f(x_n^i)\|_2^2$ refers to the Euclidean distance between the similar face feature of the anchor face image and the similar face feature of the negative sample in the same sample triplet, margin refers to the fixed minimum interval, and i is a positive integer.

In some embodiments, the training unit is further configured to input the preprocessed first training sample images into the convolutional neural network with the cross entropy loss function, and obtain the predicted classification result of the first training sample images output by the convolutional neural network; determine whether a marked classification result of the first training sample images is consistent with the predicted classification result based on the cross entropy loss function; and when the marked classification result is inconsistent with the predicted classification result, iteratively update a weight value in the convolutional neural network till the marked classification result is consistent with the predicted classification result.

In some embodiments, the extracting unit is further configured to preprocess the face image to be retrieved, where the preprocessing comprises at least clipping processing and alignment processing; and perform feature extraction on the preprocessed face image to be retrieved based on the feature extraction model.

According to a third aspect of the embodiments of the present disclosure, a similar face retrieval device is provided and includes: a processor; and a memory for storing processor executable instructions.

The processor is configured to: acquire the face image to be retrieved; perform feature extraction on the face image to be retrieved based on the feature extraction model, and take an output result of an antepenultimate layer of the feature extraction model as a first similar face feature of the face image to be retrieved, where the feature extraction model is obtained after optimizing the trained initial model based on the triplet loss function; for each face image in the face database, acquire the distance in feature space between the first similar face feature and the second similar face feature of each face image, where the second similar face feature is obtained after feature extraction of each face image based on the feature extraction model; and according to the obtained distance, retrieve a target face image with the highest similarity to the face image to be retrieved in the face database.

According to a fourth aspect of the embodiments of the present disclosure, a non-transitory computer readable storage medium is provided. When the instructions in the storage medium are executed by the processor of the similar face retrieval device, the similar face retrieval device is enabled to execute the similar face retrieval method.

The method includes: acquiring a face image to be retrieved; performing feature extraction on the face image to be retrieved based on the feature extraction model, and taking an output result of an antepenultimate layer of the feature extraction model as a first similar face feature of the face image to be retrieved, where the feature extraction model is obtained after optimizing the trained initial model based on the triplet loss function; for each face image in the face database, acquiring the distance in feature space between the first similar face feature and the second similar face feature of each face image, where the second similar face feature is obtained after feature extraction of each face image based on the feature extraction model; and according to the obtained distance, retrieving a target face image with the highest similarity to the face image to be retrieved in the face database.

According to a fifth aspect of the embodiments of the present disclosure, an application program is provided. When the instructions in the application program are executed by the processor of the similar face retrieval device, the similar face retrieval device is enabled to execute the similar face retrieval method.

The method includes: acquiring a face image to be retrieved; performing feature extraction on the face image to be retrieved based on the feature extraction model, and taking an output result of an antepenultimate layer of the feature extraction model as a first similar face feature of the face image to be retrieved, where the feature extraction model is obtained after optimizing the trained initial model based on the triplet loss function; for each face image in the face database, acquiring the distance in feature space between the first similar face feature and the second similar face feature of each face image, where the second similar face feature is obtained after feature extraction of each face image based on the feature extraction model; and according to the obtained distance, retrieving a target face image with the highest similarity to the face image to be retrieved in the face database.

BRIEF DESCRIPTION OF THE DRAWINGS

The accompanying drawings, which are incorporated in and constitute a part of this specification, illustrate embodiments consistent with the present disclosure and together with the specification serve to explain the principles of the present disclosure.

FIG. 4 is a network structure diagram of a convolutional neural network according to an exemplary embodiment.

DETAILED DESCRIPTION OF THE EMBODIMENTS

Exemplary embodiments will be described in detail herein, examples of which are shown in the accompanying drawings. When the following description refers to the drawings, unless otherwise indicated, the same numbers in different drawings indicate the same or similar elements. The implementation models described in the following exemplary embodiments do not represent all implementation models consistent with the present disclosure. They are merely examples of devices and methods consistent with some aspects of the present disclosure as detailed in the appended claims.

Before explaining the embodiments of the present disclosure in detail, an implementation environment involved in a similar face retrieval method provided by the embodiments of the present disclosure is first introduced.

Figure 1:
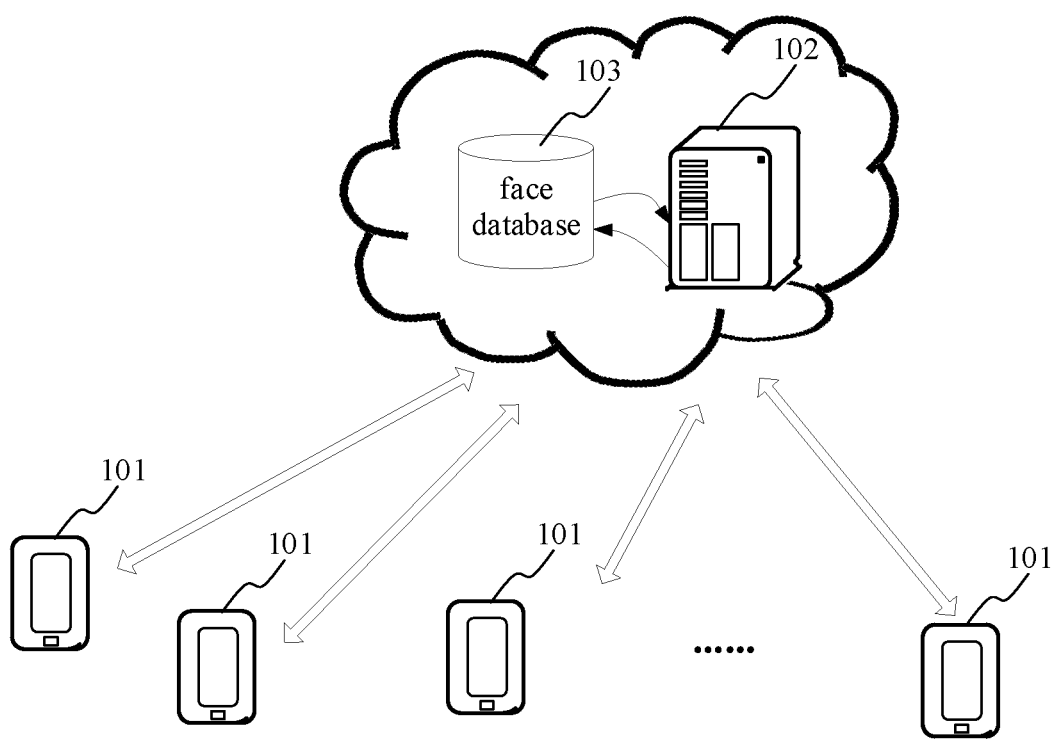
FIG. 1 is a schematic diagram of an implementation environment involved in a similar face retrieval method according to an exemplary embodiment.

Referring to FIG. 1, the implementation environment includes a terminal 101, a face retrieval device 102, and a face database 103.

The face retrieval device 102 is a server. The face retrieval device 102 and the face database 103 may be configured on the same server or on different servers, which is not limited by the embodiments of the present disclosure. The terminal 101 may be, but are not limited to, a smart phone, a desktop computer, a notebook computer, a tablet computer, etc.

In some embodiments, a specific application program may be installed in the terminal 101. Through the specific application program, the terminal 101 send a face image to be retrieved to the face retrieval device 102. The face retrieval device 102 executes the similar face retrieval method provided by the embodiments of the present disclosure, that is, the face retrieval device 102 retrieves a target face image most similar to the face image to be retrieved sent by the terminal 101 in the face database 103, and returns the target face image to the terminal 101. The terminal 101 is responsible for displaying the target face image to a terminal user.

The embodiments of the present disclosure provide a new face feature information extraction method, which realizes, based on the face recognition technology, optimization of a trained neural network model based on a triplet loss function, and obtains an optimized feature extraction model for extracting a similar face feature.

In this way, every time the face retrieval device obtains images to be retrieved, it will extract features based on the optimized feature extraction model, i.e., an output result of the antepenultimate layer of the model is taken as the similar face feature.

The embodiments of the present disclosure not only allow the extracted feature information to contain more underlying features, such as illumination, posture and expression, but also make the spatial distribution of the features more consistent with the judgment of human eyes on similar faces, ensuring that the similar faces are closer in feature space and dissimilar faces are farther in feature space.

In other words, on the one hand, the embodiments of the present disclosure can train a face identity feature extractor based on the deep learning technology, and obtain the output result of the antepenultimate layer as the similar face feature, that is, on the basis of face recognition, the extracted similar face features include more underlying features than the face identity features, such as illumination, posture and expression, where the face identity features are output results of the penultimate layer.

On the other hand, the embodiments of the present disclosure can also use the triplet loss function to optimize the trained face identity feature extractor and obtain the optimized similar face feature extraction model. The optimized similar face feature extraction model can map face images to a similar feature space to ensure that similar faces are closer in feature space. In some embodiments, the triplet loss function is tripletloss, which is used to supervise the learning of the similar face features, so that the spatial distribution of the features is more in line with the perception of the human eyes.

Figure 2:
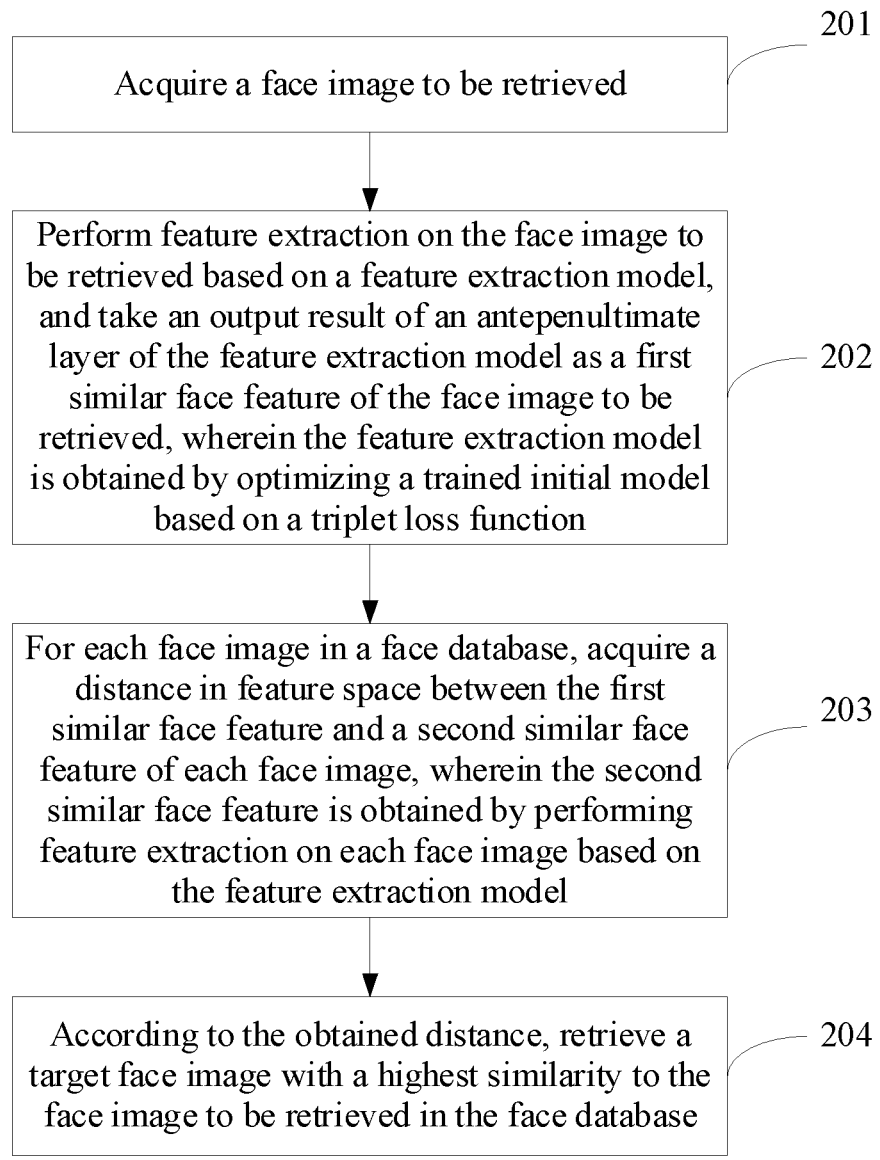
FIG. 2 is a flowchart of a similar face retrieval method according to an exemplary embodiment.

FIG. 2 is a flowchart of a similar face retrieval method according to an exemplary embodiment. As shown in FIG. 2, the method is used in a similar face retrieval device and includes the following steps.

Step 201, acquiring a face image to be retrieved.

Step 202, performing feature extraction on the face image to be retrieved based on a feature extraction model, and taking an output result of an antepenultimate layer of the feature extraction model as a first similar face feature of the face image to be retrieved. The feature extraction model is obtained after optimizing a trained initial model based on a triplet loss function.

Step 203, for each face image in a face database, acquiring a distance in feature space between the first similar face feature and a second similar face feature of each face image. The second similar face feature is obtained by performing feature extraction on each face image based on the feature extraction model.

Step 204, according to the obtained distance, retrieving a target face image with the highest similarity to the face image to be retrieved in the face database.

According to the method provided by the embodiments of the present disclosure, the embodiments of the present disclosure provide a new face feature information extraction method, which realizes, based on the face recognition technology, optimization of a trained neural network model based on a triplet loss function, and obtains an optimized feature extraction model for extracting a similar face feature.

In this way, every time the face retrieval device obtains images to be retrieved, it will extract features based on the optimized feature extraction model, i.e. an output result of the antepenultimate layer of the model is taken as the similar face feature.

The embodiments of the present disclosure not only allow the extracted feature information to contain more underlying features, such as illumination, posture and expression, but also make the spatial distribution of the features more consistent with the judgment of human eyes on similar faces, ensuring that the similar faces are closer in feature space and dissimilar faces are farther in feature space, thus greatly improving the accuracy of similar face retrieval.

In some embodiments, training processes of the feature extraction model include the following operations.

Acquiring first training sample images marked with classification information, and preprocessing the first training sample images.

Performing model training according to the preprocessed first training sample images till model convergence to obtain an initial model.

Optimizing the initial model by means of a stochastic gradient descent algorithm to obtain the trained initial model.

Optimizing the trained initial model based on the triplet loss function to obtain the feature extraction model.

In some embodiments, the optimization of the trained initial model based on the triplet loss function includes the following operations.

Acquiring second training sample images.

For an anchor face image in the second training sample images, based on the trained initial model, performing similar face retrieval in third training sample images to obtain two face images with the highest similarity (i.e. ranked in the top two), where the anchor face image is any one face image in the second training sample images.

Determining a positive sample and a negative sample in the obtained two face images, where a similarity between the positive sample and the anchor face images is higher than a similarity between the negative sample and the anchor face image.

Acquiring similar face features of all sample triplets based on the trained initial model, where each sample triplet includes an anchor face image, and a positive sample and a negative sample of the anchor face image.

According to the obtained similar face features of the sample triplets, constructing the triplet loss function, and optimizing the triplet loss function by means of the stochastic gradient descent algorithm till convergence.

In some embodiments, the convergence condition of the triplet loss function is that a first distance is smaller than a second distance.

The first distance refers to a distance in feature space between a similar face feature of an anchor face image and a similar face feature of a positive sample in a same sample triplet, and the second distance refers to a distance in feature space between the similar face feature of the anchor face image and a similar face feature of a negative sample.

In some embodiments, the expression of the triplet loss function is:

$$\text{loss} = \max(0, \|f(x_a^i) - f(x_p^i)\|_2^2 + \text{margin} - \|f(x_a^i) - f(x_n^i)\|_2^2).$$

Where loss refers to the triplet loss function, $\|f(x_a^i) - f(x_p^i)\|_2^2$ refers to an Euclidean distance between a similar face feature of an anchor face image and a similar face feature of a positive sample in a same sample triplet, $\|f(x_a^i) - f(x_n^i)\|_2^2$ refers to an Euclidean distance between the similar face feature of the anchor face image and a similar face feature of a negative sample in the same sample triplet, margin refers to a fixed minimum interval, and i is a positive integer.

In some embodiments, the performing model training according to the preprocessed first training sample images till model convergence to obtain the initial model includes the following operations.

Inputting the preprocessed first training sample images into a convolutional neural network with a cross entropy loss function to obtain a predicted classification result of the first training sample images output by the convolutional neural network.

Determining whether a marked classification result of the first training sample images is consistent with the predicted classification result based on the cross entropy loss function.

When the marked classification result is inconsistent with the predicted classification result, iteratively updating a weight value in the convolution neural network till the marked classification result is consistent with the predicted classification result.

In some embodiments, the performing feature extraction on the face image to be retrieved based on the feature extraction model includes the following operations.

Preprocessing the face image to be retrieved, where the preprocessing comprises at least clipping processing and alignment processing.

Performing feature extraction on the preprocessed face image to be retrieved based on the feature extraction model.

All of the above-mentioned alternative schemes can be combined to form alternative embodiments of the present disclosure, which will not be detailed here.

It should be noted that descriptions like first, second, third, fourth, etc., in the following embodiments are only used to distinguish different objects and do not constitute any other special restrictions on each object.

Figure 3A:
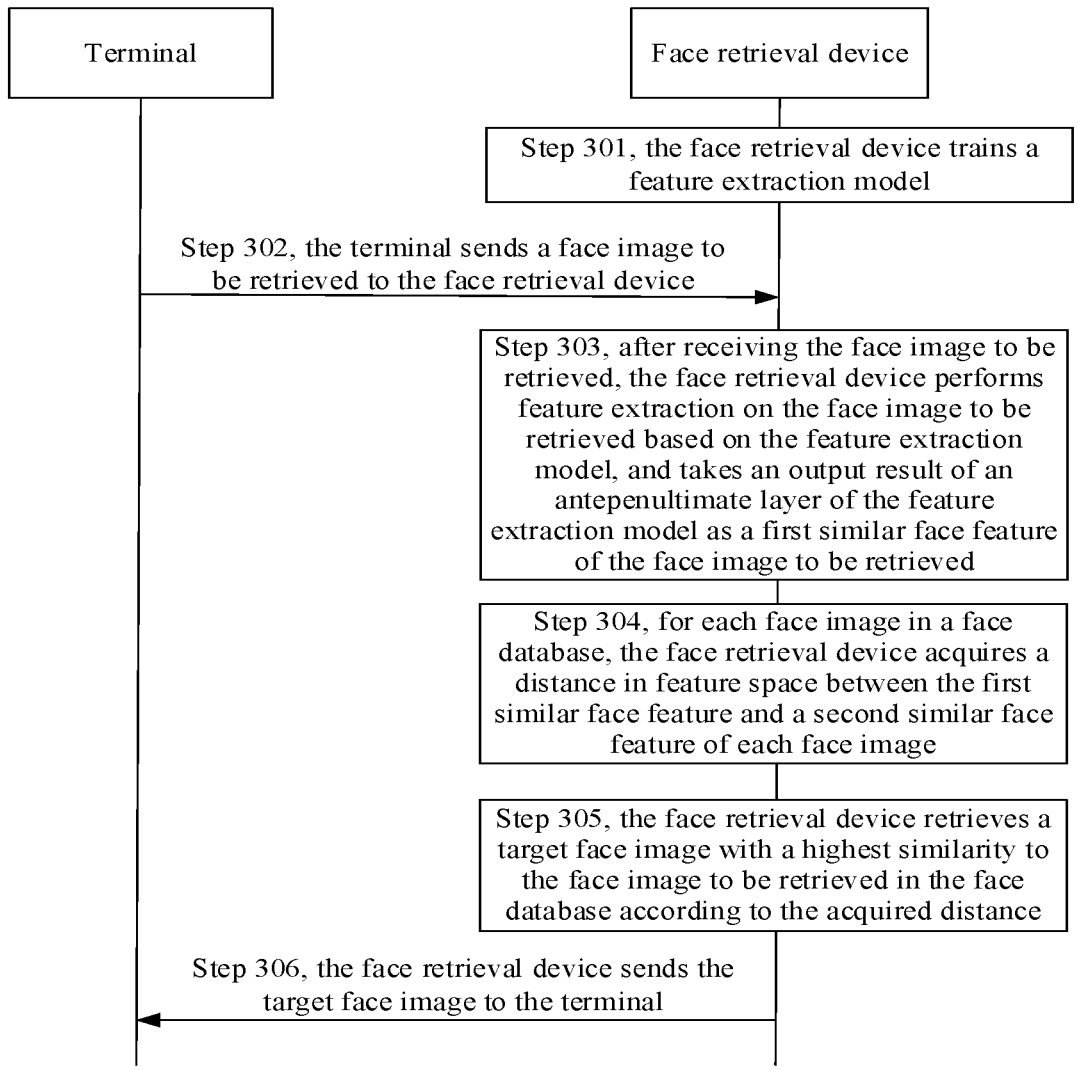
FIG. 3A is a flowchart of the similar face retrieval method according to the exemplary embodiment.

FIG. 3A is a flowchart of the similar face retrieval method according to an exemplary embodiment. As shown in FIG. 3A, the interaction agents of the method include a terminal and a face retrieval device, and the method includes the following steps.

Step 301, the face retrieval device trains a feature extraction model.

Figure 3B:
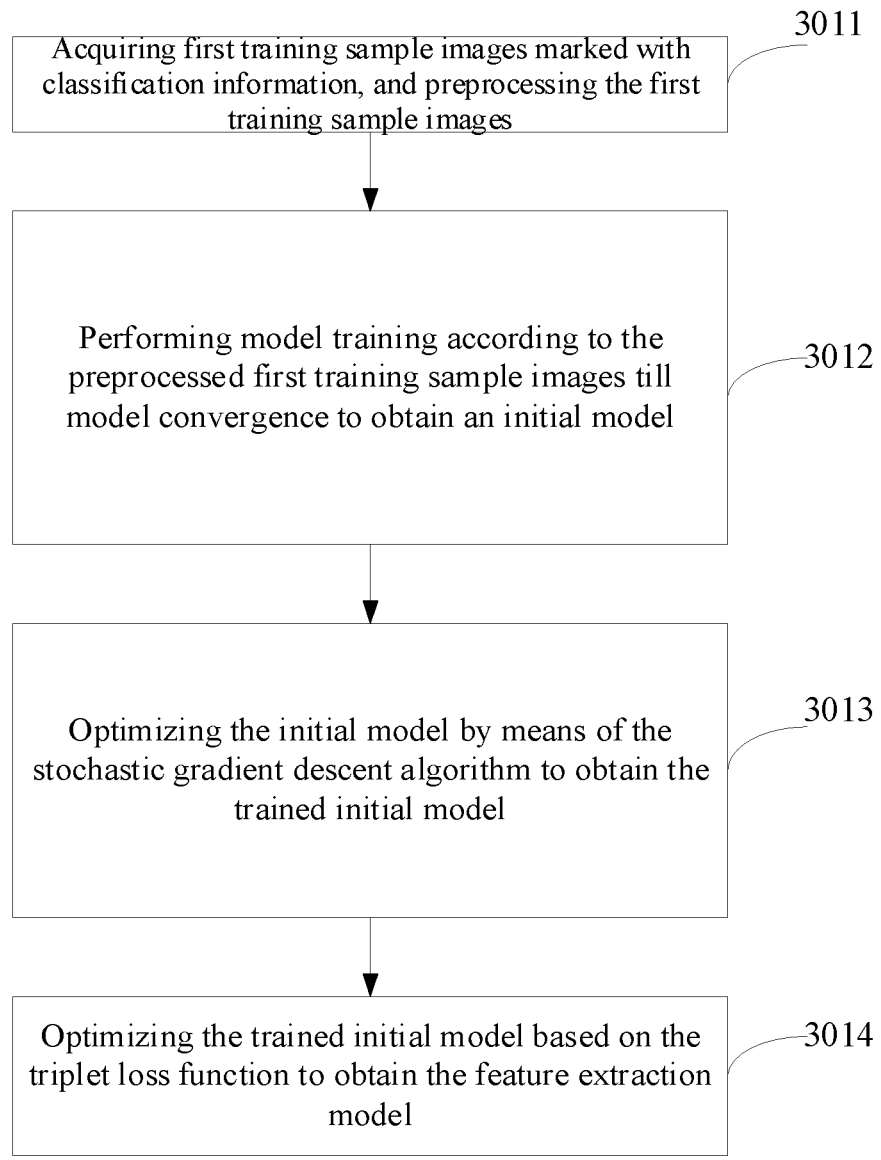
FIG. 3B is a flowchart of a training process according to the exemplary embodiment.

In the embodiments of the present disclosure, the feature extraction model refers to an optimized similar face feature extraction model for extracting one or more similar face features. A training process of the model includes the steps 3011 to 3014 as shown in FIG. 3B.

3011, Acquiring first training sample images marked with classification information, and preprocessing the first training sample images.

As an example, the embodiments of the present disclosure adopt a disclosed webface data set as the first training sample images. The disclosed webface data set contains 10,000 face IDs (that is, 10,000 people) and a total of 500,000 face images.

The preprocessing of the first training sample images includes, but is not limited to, clipping processing and alignment processing of the face images. For example, after preprocessing, RGB face images with a resolution of 128× 128 are obtained.

3012, Performing model training according to the preprocessed first training sample images till model convergence to obtain an initial model.

In some embodiments, training processes of the initial model include the following operations.

(a) Inputting the preprocessed first training sample images into the convolutional neural network shown in FIG. 4.

Figure 5:
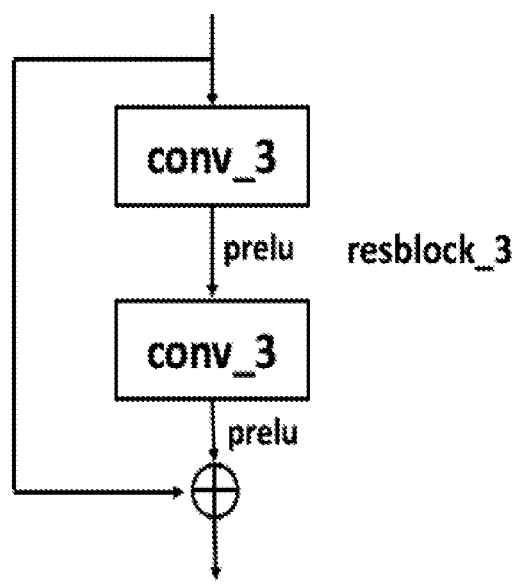
FIG. 5 is a schematic diagram of a residual block according to an exemplary embodiment.

As an example, the network structure of the convolutional neural network can be shown in FIGS. 4 and 5. The 128×128 RGB images, that is, the 128×128 RGB images obtained after preprocessing the first training sample images are input, and 1024-dimensional feature vectors are output, that is, the convolutional neural network maps the face images to 1024-dimensional features. It should be noted that the features actually represent the face identity features and are generally used for face recognition.

The structure of a resblock in FIG. 4 is shown in FIG. 5. The resblock includes an identity mapping and at least two convolution layers. The identity mapping of the resblock points from an input end of the resblock to an output end of the resblock, i.e., adding an identity mapping to convert the original function H(x) to F(x)+x. Although the two expressions have the same effect, there is difference in optimization difficulty. Through a reformulation, one problem can be decomposed into multiple scale-direct residual problems, so as to optimize the training.

As shown in FIG. 5, the resblock is realized through Shortcut connection, and the input and output of the resblock are superimposed through Shortcut connection. On the premise of not adding additional parameters and calculation amount to the network, the training speed of the model is greatly increased, and the training effect is improved; moreover, when the number of layers of the model is increased, the above structure can well solve the degradation problem.

That is, H(x) is a desired complex potential mapping, which is difficult to learn; if the input x is directly transferred to the output through Shortcut connection in FIG. 5 as an initial result, then the learning target at this point is F(x)=H(x)−x, which is equivalent to a change in learning target, that is, learning the difference between the optimal solution H(x) and the congruent mapping x, i.e., residual mapping F(x), instead of learning a complete output. It should be noted that Shortcut originally refers to a shorter alternative route, but means cross-layer connection herein. Shortcut connection has no weight. After x is passed, each resblock only learns residual mapping F(x). As a stable network is good for learning, the performance will gradually improve with the increase of network depth. Therefore, when the number of layers of the network is large enough, optimizing the residual mapping F(x)=H(x)−x will facilitate the optimization of a complex nonlinear mapping H(x).

(b) Obtaining a predicted classification result of the first training sample images output by the convolutional neural network.

The first training sample images are sequentially input into the convolutional neural network, and the model classification information output by a full connection layer of the convolutional neural network, i.e., the predicted classification result, is obtained. The predicted classification result is excitation data output by the convolutional neural network according to the input first training sample images. Before the convolutional neural network is trained to converge, the predicted classification result is not accurate enough. After the convolutional neural network is trained to converge, the predicted classification result obtained has higher accuracy.

(c) Determining whether a marked classification result of the first training sample images is consistent with the predicted classification result, and when the marked classification result is inconsistent with the predicted classification result, iteratively updating a weight value in the convolution neural network till the marked classification result is consistent with the predicted classification result.

In the embodiments of the present disclosure, the classification loss function is a cross entropy loss function, that is, based on the cross entropy loss function, whether the marked classification result of the first training sample images is consistent with the predicted classification result is determined.

In other words, the loss function is a detection function for detecting whether the predicted classification result output by the convolutional neural network is consistent with an expected marked classification result. When the output result of the convolutional neural network is inconsistent with the expected result, the weight value in the convolutional neural network needs to be corrected so that the output result of the convolutional neural network is consistent with the expected result, for example, model training is stopped when the accuracy reaches 95% or more, and the model converges.

3013, Optimizing the initial model by means of the stochastic gradient descent algorithm to obtain the trained initial model.

In the embodiments of the present disclosure, the stochastic gradient descent algorithm is adopted to optimize the initial model obtained above.

As an example, in the stochastic gradient algorithm, the learning rate may be set to 0.05-0.5, the momentum factor may be set to 0.01-0.1, and the weight attenuation may be set to 0.0001-0.001, which are not specifically limited by the embodiments of the present disclosure. In some embodiments, the learning rate may be 0.01, the momentum factor may be 0.09, and the weight attenuation may be 0.0005.

The first point to be noted is that in the trained initial model, the embodiments of the present disclosure take the output result of the antepenultimate layer of the model as the similar face features, i.e., the 4×4×1024-dimensional similar face features are extracted to ensure that the underlying features are included in the extracted similar face features.

The second point to be noted is that after the trained initial model is obtained, the embodiments of the present disclosure will also use the triplet loss function tripletloss to optimize the model so as to make the spatial distribution of the features more in line with the perception of the human eyes, as explained in step 3014.

3014, Optimizing the trained initial model based on the triplet loss function to obtain the feature extraction model.

In this step, the optimization of the trained initial model based on the triplet loss function includes the following operations.

(1) Acquiring second training sample images.

As an example, the second training sample images are part of face images in the first training sample images. For example, the second training sample images are 50,000 face images randomly selected from the 500,000 face images included in the first training sample images, which is not specifically limited in the embodiments of the present disclosure.

(2) For an anchor face image in the second training sample images, based on the trained initial model, performing similar face retrieval in third training sample images to obtain the two face images with the highest similarity (i.e. ranked in the top two).

As an example, the third training sample images are the face images remaining in the first training sample images except for the second training sample images. For example, the third training sample images are the remaining 450,000 face images among the 500,000 face images included in the first training sample images, which is not specifically limited in the embodiments of the present disclosure.

In the embodiments of the present disclosure, the two face images most similar to each face image in the second training sample images will be retrieved in the third training sample images to form a sample triplet.

Figure 6:
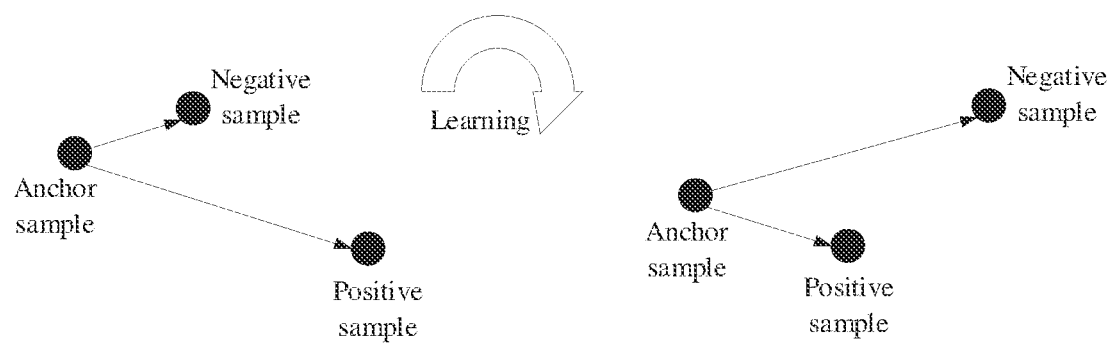
FIG. 6 is a schematic diagram of a distribution relationship of sample images according to an exemplary embodiment.

As shown in FIG. 6, each sample triplet includes an anchor sample, a positive sample, and a negative sample, i.e., (Anchor, Positive, Negative) triplet. The anchor sample is also called an anchor face image herein. The anchor face image in one sample triplet comes from the second training sample images, while the positive sample and the negative sample come from the third training sample images.

In the embodiments of the present disclosure, for each face image in the second training sample images, similar face features of the face image are extracted based on the trained initial model, and similar face features of a face image included in the third training sample images are extracted; then cos distances between the similar face features of the face image extracted based on the trained initial model and the similar face features of each face image included in the third training sample images are calculated, and the cos distances are ranked from large to small: the larger the cos distance, the higher the similarity; and finally the two face images with the cos distances in the first two places are selected to serve as the two face images with the highest similarity.

(3) Determining a positive sample and a negative sample in the two face images.

In the embodiments of the present disclosure, for each face image in the second training sample images, the similarity between the selected two face images and the face image is determined by manual marking, the more similar face images are marked as Positive, and the less similar face images are marked as Negative, that is, the similarity between the positive sample and the anchor face image is higher than the similarity between the negative sample and the anchor face image.

(4) Obtaining the similar face features of all the sample triplets based on the trained initial model.

Since each sample triplet includes an anchor face image, and positive and negative samples of the anchor face image, a feature triplet can be obtained after a sample triplet is mapped by the trained initial model, i.e., the feature triplet is:

$$(f(x_a^i), f(x_p^i), f(x_n^i)).$$

(5) Constructing the triplet loss function according to the obtained similar face features of all sample triplets, and optimizing the triplet loss function by means of the stochastic gradient descent algorithm till convergence.

As shown in FIG. 6, a desired relationship between the similar face features is that the distance in feature space between the similar face features of Anchor and the similar face features of Positive is shorter than the distance in feature space between the similar face features of Anchor and the similar face features of Negative, i.e., the distribution relationship shown in FIG. 6 should be realized after learning.

In the embodiments of the present disclosure, the expression of the triplet loss function is:

$$\text{loss} = \max(0, \|f(x_a^i) - f(x_p^i)\|_2^2 + \text{margin} - \|f(x_a^i) - f(x_n^i)\|_2^2).$$

Where loss refers to the triplet loss function, $\|f(x_a^i) - f(x_p^i)\|_2^2$ refers to the Euclidean distance between the similar face feature of the anchor face image and the similar face feature of the positive sample in the same sample triplet, $\|f(x_a^i) - f(x_n^i)\|_2^2$ refers to the Euclidean distance between the similar face feature of the anchor face image and the similar face feature of the negative sample in the same sample triplet, margin refers to the fixed minimum interval, and i is a positive integer.

The objective of model optimization is to make the above-mentioned triplet loss function converge, that is, to make the distance between the anchor face image and the positive sample in the same sample triplet as close as possible, and the distance between the anchor face image and the negative sample as far as possible.

In some embodiments, the convergence condition of the triplet loss function is: the first distance is smaller than the second distance. The first distance refers to the distance in feature space between the similar face feature of the anchor face image and the similar face feature of the positive sample in the same sample triplet, and the second distance refers to the distance in feature space between the similar face feature of the anchor face image and the similar face feature of the negative sample.

As an example, the embodiments of the present disclosure use the stochastic gradient descent algorithm to optimize tripletloss till convergence, so that the obtained feature extraction model can better extract the similar face features.

It should be noted that the reason for setting the fixed minimum interval margin is that, in addition to keeping the distance in feature expression between the anchor face images and the positive samples as small as possible and the distance in feature expression between the anchor face images and the negative samples as far as possible, a minimum interval should be maintained between the distance between the anchor face images and the negative samples and the distance between the anchor face images and the positive samples, so as to ensure the accuracy of learning.

Step 302, the terminal sends the face image to be retrieved to the face retrieval device.

The terminal may send the face image to be retrieved to the face retrieval device in the form of a face retrieval request, and the face retrieval request may be sent by means of a POST method, which is not specifically limited in the embodiments of the present disclosure.

Step 303, after receiving the face image to be retrieved, the face retrieval device performs feature extraction on the face image to be retrieved based on the feature extraction model, and takes the output result of the antepenultimate layer of the feature extraction model as the first similar face feature of the face image to be retrieved.

Since the optimized feature extraction model has been obtained from the above steps, the face retrieval device can directly extract the similar face features based on the feature extraction model after receiving the face images to be retrieved.

In some embodiments, the feature extraction of the face images to be retrieved based on the feature extraction model includes: preprocessing the face image to be retrieved, where the preprocessing includes at least clipping processing and alignment processing; and performing feature extraction on the preprocessed face image to be retrieved based on the feature extraction model, and taking the output result of the antepenultimate layer of the feature extraction model as the first similar face feature of the face image to be retrieved.

Step 304, for each face image in the face database, the face retrieval device acquires the distance in feature space between the first similar face feature and the second similar face feature of each face image.

The second similar face feature is also obtained by feature extraction of each face image based on the feature extraction model, and herein, the similar face feature of each face image in the face database is called the second similar face feature. In some embodiments, when acquiring the distance in feature space between the first similar face feature and the second similar face feature of each face image in the face database, the cos distance between the two can be calculated, which is not specifically limited by the embodiments of the present disclosure.

Step 305, the face retrieval device retrieves the target face image with the highest similarity to the face image to be retrieved in the face database according to the acquired distance information.

As shown in the above steps, the target face image with the highest similarity to the face image to be retrieved is the face image with the largest cos distance in features. For example, the obtained cos distances can be ranked from large to small, and then the face image corresponding to the cos distance in the first place can be taken as the target face image with the highest similarity to the face image to be retrieved.

Step 306, the face retrieval device sends the target face image to the terminal.

The face retrieval device may send the target face image to the terminal in the form of JavaScript Object Notification (JSON), which is not specifically limited in the embodiments of the present disclosure.

According to the method provided by the embodiments of the present disclosure, the embodiments of the present disclosure provide a novel face feature information extraction method, which realizes optimization of the trained neural network model based on the triplet loss function by means of the face recognition technology, and finally obtains the optimized feature extraction model for extracting the similar face features.

In this way, every time the face retrieval device obtains an image to be retrieved, it will extract the features based on the optimized feature extraction model, i.e., the output result of the antepenultimate layer of the model is taken as the similar face features.

The embodiments of the present disclosure not only allow the extracted feature information to contain the more underlying features, such as illumination, posture and expression, but also make the spatial distribution of the features more consistent with the judgment of the human eyes on the similar faces, ensuring that the similar faces are closer in feature space and the dissimilar faces are farther in feature space, thus greatly improving the accuracy of similar face retrieval.

Figure 7:
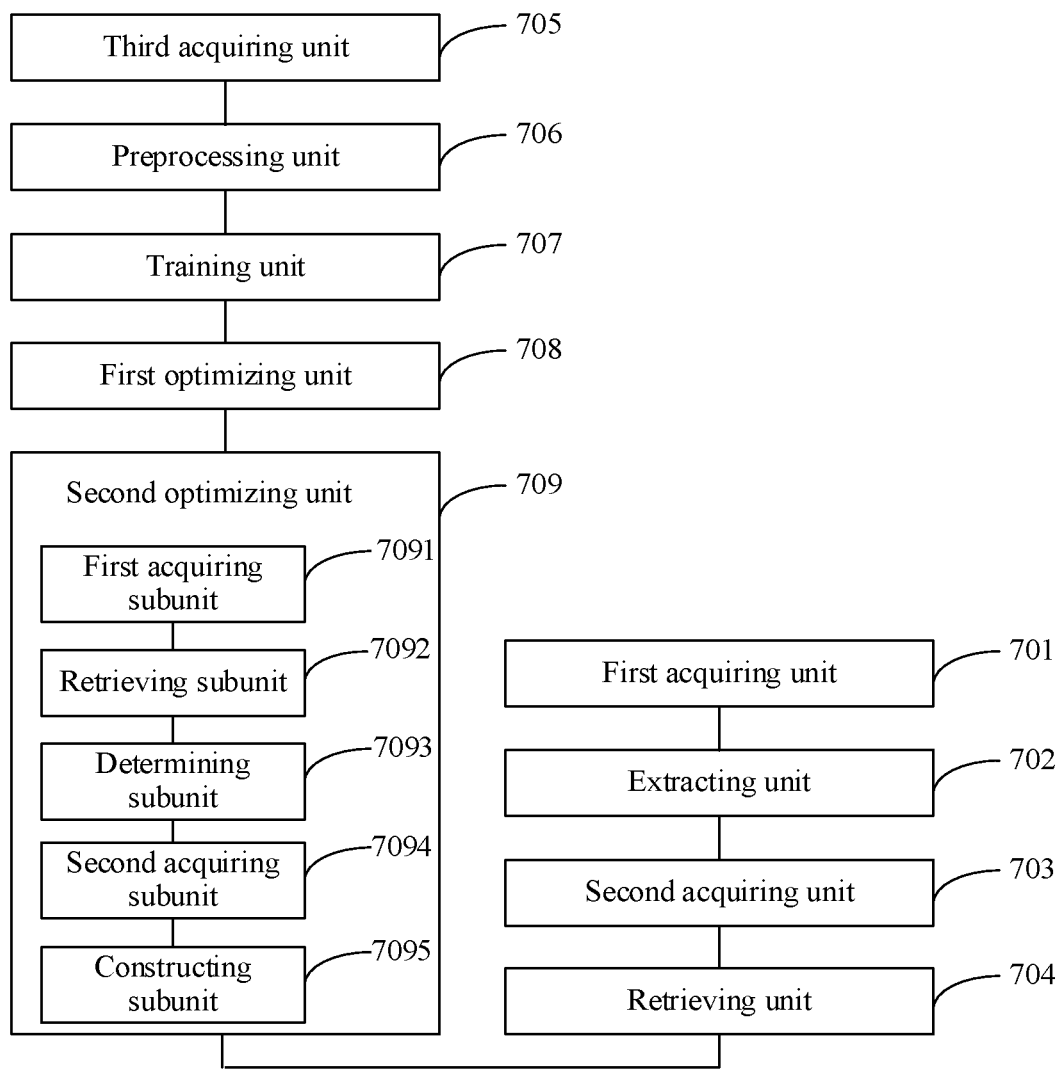
FIG. 7 is a block diagram of a similar face retrieval device according to an exemplary embodiment.

FIG. 7 is a block diagram of the similar face retrieval device according to an exemplary embodiment. Referring to FIG. 7, the device includes a first acquiring unit 701, an extracting unit 702, a second acquiring unit 703, and a retrieving unit 704.

The first acquiring unit 701 is configured to acquire the face image to be retrieved.

The extracting unit 702 is configured to perform feature extraction on the face image to be retrieved based on the feature extraction model, and take the output result of the antepenultimate layer of the feature extraction model as the first similar face feature of the face image to be retrieved. The feature extraction model is obtained after optimizing the trained initial model based on the triplet loss function.

The second acquiring unit 703 is configured to, for each face image in the face database, acquire the distance in feature space between the first similar face features and the second similar face feature of each face image, wherein the second similar face feature is obtained after feature extraction of each face image based on the feature extraction model.

The retrieving unit 704 is configured to, according to the obtained distance information, retrieve the target face images with the highest similarity to the face images to be retrieved in the face database.

According to the device provided by the embodiments of the present disclosure, the embodiments of the present disclosure provide the novel face feature information extraction method, which realizes optimization of the trained neural network model based on the triplet loss function by means of the face recognition technology, and finally obtains the optimized feature extraction model for extracting the similar face features. In this way, every time the face retrieval device obtains an image to be retrieved, it will extract the features based on the optimized feature extraction model, i.e., the output result of the antepenultimate layer of the model is taken as the similar face features. The embodiments of the present disclosure not only allow the extracted feature information to contain more underlying features, such as illumination, posture and expression, but also make the spatial distribution of the features more consistent with the judgment of the human eyes on the similar faces, ensuring that the similar faces are closer in feature space and the dissimilar faces are farther in feature space, thus greatly improving the accuracy of similar face retrieval.

In some embodiments, the device further includes a third acquiring unit 705, a preprocessing unit 706, a training unit 707, a first optimizing unit 708, and a second optimizing unit 709.

A third acquiring unit 705 is configured to acquire the first training sample images marked with the classification information.

A preprocessing unit 706 is configured to preprocess the first training sample images.

A training unit 707 is configured to perform model training according to the preprocessed first training sample images till model convergence to obtain the initial model.

A first optimizing unit 708 is configured to optimize the initial model by means of a stochastic gradient descent algorithm to obtain the trained initial model.

A second optimizing unit 709 is configured to optimize the trained initial model based on the triplet loss function to obtain the feature extraction model.

In some embodiments, the second optimizing unit 709 includes a first acquiring subunit 7091, a retrieving subunit 7092, a determining subunit 7093, a second acquiring subunit 7094 and a constructing subunit 7095.

A first acquiring subunit 7091 is configured to acquire the second training sample images.

A retrieving subunit 7092 is configured to, for the anchor face image in the second training sample images, based on the trained initial model, perform similar face retrieval in the third training sample images to obtain the two face images with the highest similarity, where the anchor face image is any one face image in the second training sample images.

A determining subunit 7093 is configured to determine the positive sample and the negative sample in the two face images, where the similarity between the positive sample and the anchor face image is higher than of the similarity between the negative sample and the anchor face image.

A second acquiring subunit 7094 is configured to acquire the similar face features of all the sample triplets based on the trained initial model, where each sample triplet includes an anchor face image, and a positive sample and a negative sample of the anchor face image.

A constructing subunit 7095 is configured to, according to the obtained similar face features of the sample triplets, construct the triplet loss function, and optimize the triplet loss function by means of the stochastic gradient descent algorithm till convergence.

In some embodiments, the convergence condition of the triplet loss function is that the first distance is smaller than the second distance.

The first distance refers to the distance in feature space between the similar face feature of the anchor face image and the similar face feature of the positive sample in the same sample triplet, and the second distance refers to the distance in feature space between the similar face feature of the anchor face image and the similar face feature of the negative sample.

In some embodiments, the expression of the triplet loss function is:

$$loss=\max(0, \|f(x_a^i)-f(x_p^i)\|_2^2+\text{margin}-\|f(x_a^i)-f(x_n^i)\|_2^2).$$

Where loss refers to the triplet loss function, $\|f(x_a^i)-f(x_p^i)\|_2^2$ refers to the Euclidean distance between the similar face feature of the anchor face image and the similar face feature of the positive sample in the same sample triplet, $\|f(x_a^i)-f(x_n^i)\|_2^2$ refers to the Euclidean distance between the similar face feature of the anchor face image and the similar face feature of the negative sample in the same sample triplet, margin refers to the fixed minimum interval, and i is a positive integer.

In some embodiments, the training unit 707 is further configured to input the preprocessed first training sample images into the convolutional neural network with the cross entropy loss function, and obtain the predicted classification result of the first training sample images output by the convolutional neural network; determine whether the marked classification result of the first training sample images is consistent with the predicted classification result based on the cross entropy loss function; and when the marked classification result is inconsistent with the predicted classification result, iteratively update the weight value in the convolutional neural network till the marked classification result is consistent with the predicted classification result.

In some embodiments, the extracting unit 702 is further configured to preprocess the face image to be retrieved, where the preprocessing comprises at least clipping processing and alignment processing; and perform feature extraction on the preprocessed face image to be retrieved based on the feature extraction model.

All of the above-mentioned alternative technical schemes can be combined to form alternative embodiments of the present disclosure, which will not be detailed here.

For the device in the above embodiments, the specific operating manner of each unit has been described in detail in the method embodiments, and will not be described in detail here.

Figure 8:
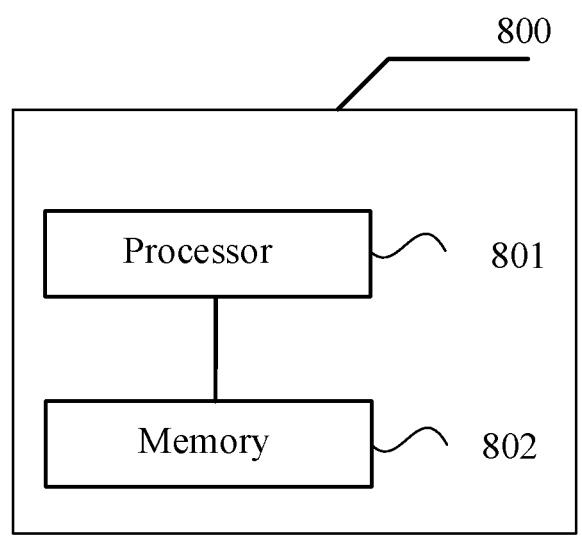
FIG. 8 is a block diagram of a similar face retrieval device according to an exemplary embodiment.

FIG. 8 is a structural diagram of the similar face retrieval device provided by the embodiments of the present disclosure. The device 800 may vary with different configurations or performances, and may include one or more processors 801, such as central processing units (CPU), and one or more memories 802. The memory 802 stores at least one instruction, and the at least one instruction is loaded and executed by the processor 801 to realize the similar face retrieval method provided by the above various methods in the embodiments of the present disclosure. Of course, the device may also include a wired or wireless network interface, a keyboard, an input-output interface and other components for input and output, and the device may also include other components for realizing device functions, which will not be described in detail here.

In the exemplary embodiments, the computer readable storage medium is also provided, such as a memory including instructions executable by a processor in the terminal to complete the similar face retrieval method in the above embodiments. For example, the computer readable storage medium may be a read only memory (ROM), a random access memory (RAM), a compact disc read-only memory (CD-ROM), magnetic tape, floppy disk, optical data storage device, etc.

Other embodiments of the present disclosure will readily occur to those skilled in the art upon consideration of the specification and practice of the disclosure disclosed herein. The present disclosure is intended to cover any variation, use or adaptation of the present disclosure, which follows the general principles of the present disclosure and includes common knowledge or conventional technical means in the technical field not disclosed in the present disclosure. The specification and embodiments are to be considered as exemplary only, with the true scope and spirit of the disclosure being indicated by the following claims.

It should be understood that the present disclosure is not limited to the precise structure already described above and shown in the drawings, and various modifications and changes may be made without departing from the scope thereof. The scope of the present disclosure is limited only by the appended claims.

The invention claimed is:

1. A similar face retrieval method, comprising:
acquiring a face image to be retrieved;
performing feature extraction on the face image to be retrieved based on a feature extraction model, wherein the feature extraction model is obtained by optimizing a trained initial model based on a triplet loss function;
taking an output result of an antepenultimate layer of the feature extraction model as a first similar face feature of the face image to be retrieved;
for each face image in a face database, acquiring a distance in feature space between the first similar face feature and a second similar face feature of each face image, wherein the second similar face feature is obtained by performing feature extraction on each face image based on the feature extraction model; and
according to the obtained distance, retrieving a target face image with a highest similarity to the face image to be retrieved in the face database;
wherein training processes of the feature extraction model comprise:
acquiring first training sample images marked with classification information;
preprocessing the first training sample images;
performing model training according to the preprocessed first training sample images till model convergence to obtain an initial model;
optimizing the initial model by means of a stochastic gradient descent algorithm to obtain the trained initial model; and
optimizing the trained initial model based on the triplet loss function to obtain the feature extraction model;
wherein the optimizing the trained initial model based on the triplet loss function comprises:
acquiring second training sample images;
for an anchor face image in the second training sample images, based on the trained initial model, performing similar face retrieval in third training sample images to obtain two face images with similarity ranked in the top two, wherein the anchor face image is any one face image in the second training sample images;
determining a positive sample and a negative sample in the obtained two face images, wherein a similarity between the positive sample and the anchor face image is higher than a similarity between the negative sample and the anchor face image;
acquiring similar face features of all sample triplets based on the trained initial model, wherein each sample triplet comprises an anchor face image, and a positive sample and a negative sample of the anchor face image; and
according to the obtained similar face features of the sample triplets, constructing the triplet loss function, and optimizing the triplet loss function by means of the stochastic gradient descent algorithm till convergence.

2. The similar face retrieval method according to claim 1, wherein a convergence condition of the triplet loss function is that a first distance is smaller than a second distance;
wherein the first distance indicates a distance in feature space between a similar face feature of an anchor face image and a similar face feature of a positive sample in a same sample triplet, and the second distance indicates a distance in feature space between the similar face feature of the anchor face image and a similar face feature of a negative sample.

3. The similar face retrieval method according to claim 1, wherein a formula of the triplet loss function is:

$$\text{loss}=\max(0,\|f(x_a^i)-f(x_p^i)\|_2^2+\text{margin}-\|f(x_a^i)-f(x_n^i)\|_2^2);$$

wherein loss refers to the triplet loss function, $\|f(x_a^i)-f(x_p^i)\|_2^2$ refers to an Euclidean distance between a similar face feature of an anchor face image and a similar face feature of a positive sample in a same sample triplet, $\|f(x_a^i)-f(x_n^i)\|_2^2$ refers to an Euclidean distance between the similar face feature of the anchor face image and a similar face feature of a negative sample in the same sample triplet, margin refers to a fixed minimum interval, and i is a positive integer.

4. The similar face retrieval method according to claim 1, wherein the performing model training according to the preprocessed first training sample images till model convergence to obtain the initial model comprises:
inputting the preprocessed first training sample images into a convolutional neural network with a cross entropy loss function, and obtaining a predicted classification result of the first training sample images output by the convolutional neural network;
determining whether a marked classification result of the first training sample images is consistent with the predicted classification result based on the cross entropy loss function; and
when the marked classification result is inconsistent with the predicted classification result, iteratively updating a weight value in the convolutional neural network till the marked classification result is consistent with the predicted classification result.

5. The similar face retrieval method according to claim 1, wherein the performing feature extraction on the face image to be retrieved based on the feature extraction model comprises:
preprocessing the face image to be retrieved, wherein the preprocessing comprises at least clipping processing and alignment processing; and
performing feature extraction on the preprocessed face image to be retrieved based on the feature extraction model.

6. The similar face retrieval method according to claim 1, wherein
the second training sample images are part of face images in the first training sample images;
the third training sample images are face images remaining in the first training sample images except for the second training sample images; and
the anchor face image in the each sample triplet comes from the second training sample images, and the positive sample and the negative sample in the each sample triplet come from the third training sample images.

7. A similar face retrieval device, comprising: a memory and at least one processor, wherein the at least one processor is configured to read and execute processor executable instructions stored in the memory to:
acquire a face image to be retrieved;
perform feature extraction on the face image to be retrieved based on a feature extraction model, and take an output result of an antepenultimate layer of the feature extraction model as a first similar face feature of the face image to be retrieved, wherein the feature extraction model is obtained by optimizing a trained initial model based on a triplet loss function;

for each face image in a face database, acquire a distance in feature space between the first similar face feature and a second similar face feature of each face image, wherein the second similar face feature is obtained by performing feature extraction on each face image based on the feature extraction model; and according to the obtained distance, retrieve a target face image with a highest similarity to the face image to be retrieved in the face database;

wherein the at least one processor is further configured to read and execute the processor executable instructions stored in the memory to perform training processes of the feature extraction model by:

acquiring first training sample images marked with classification information;

preprocessing the first training sample images;

performing model training according to the preprocessed first training sample images till model convergence to obtain an initial model;

optimizing the initial model by means of a stochastic gradient descent algorithm to obtain the trained initial model; and optimizing the trained initial model based on the triplet loss function to obtain the feature extraction model;

wherein the at least one processor is further configured to read and execute the processor executable instructions stored in the memory to:

acquire second training sample images;

for an anchor face image in the second training sample images, based on the trained initial model, perform similar face retrieval in third training sample images to obtain two face images with similarity ranked in the top two, wherein the anchor face image is any one face image in the second training sample images;

determine a positive sample and a negative sample in the obtained two face images, wherein a similarity between the positive sample and the anchor face image is higher than a similarity between the negative sample and the anchor face image;

acquire similar face features of all sample triplets based on the trained initial model, wherein each sample triplet comprises an anchor face image, and a positive sample and a negative sample of the anchor face image; and according to the obtained similar face features of the sample triplets, construct the triplet loss function, and optimize the triplet loss function by means of the stochastic gradient descent algorithm till convergence.

8. The similar face retrieval device according to claim 7, wherein a convergence condition of the triplet loss function is that a first distance is smaller than a second distance;

wherein the first distance indicates a distance in feature space between a similar face feature of an anchor face image and a similar face feature of a positive sample in a same sample triplet, and the second distance indicates a distance in feature space between the similar face feature of the anchor face image and a similar face feature of a negative sample.

9. The similar face retrieval device according to claim 7, wherein a formula of the triplet loss function is:

$$loss = \max(0, \|f(x_a^i) - f(x_p^i)\|_2^2 + margin - \|f(x_a^i) - f(x_n^i)\|_2^2);$$

wherein loss refers to the triplet loss function, $\|f(x_a^i) - f(x_p^i)\|_2^2$ refers to an Euclidean distance between a similar face feature of an anchor face image and a similar face feature of a positive sample in a same sample triplet, $\|f(x_a^i) - f(x_n^i)\|_2^2$ refers to an Euclidean distance between the similar face feature of the anchor face image and a similar face feature of a negative sample in the same sample triplet, refers to a fixed minimum interval, and i is a positive integer.

10. The similar face retrieval device according to claim 7, wherein the at least one processor is further configured to read and execute the processor executable instructions stored in the memory to:

input the preprocessed first training sample images into a convolutional neural network with a cross entropy loss function, and obtain a predicted classification result of the first training sample images output by the convolutional neural network;

determine whether a marked classification result of the first training sample images is consistent with the predicted classification result based on the cross entropy loss function; and when the marked classification result is inconsistent with the predicted classification result, iteratively update a weight value in the convolutional neural network till the marked classification result is consistent with the predicted classification result.

11. The similar face retrieval device according to claim 7, wherein the at least one processor is further configured to read and execute the processor executable instructions stored in the memory to:

preprocess the face image to be retrieved, wherein the preprocessing comprises at least clipping processing and alignment processing; and perform feature extraction on the preprocessed face image to be retrieved based on the feature extraction model.

12. A non-transitory computer readable storage medium, wherein when instructions in the storage medium are executed by a processor of a similar face retrieval device, the similar face retrieval device is enabled to execute a similar face retrieval method, the method comprising:

acquiring a face image to be retrieved;

performing feature extraction on the face image to be retrieved based on a feature extraction model, wherein the feature extraction model is obtained by optimizing a trained initial model based on a triplet loss function;

taking an output result of an antepenultimate layer of the feature extraction model as a first similar face feature of the face image to be retrieved;

for each face image in a face database, acquiring a distance in feature space between the first similar face feature and a second similar face feature of each face image, wherein the second similar face feature is obtained by performing feature extraction on each face image based on the feature extraction model; and according to the obtained distance, retrieving a target face image with a highest similarity to the face image to be retrieved in the face database;

wherein training processes of the feature extraction model comprise:

acquiring first training sample images marked with classification information;

preprocessing the first training sample images;

performing model training according to the preprocessed first training sample images till model convergence to obtain an initial model;

optimizing the initial model by means of a stochastic gradient descent algorithm to obtain the trained initial model; and optimizing the trained initial model based on the triplet loss function to obtain the feature extraction model;

wherein the optimizing the trained initial model based on the triplet loss function comprises:

acquiring second training sample images;

for an anchor face image in the second training sample images, based on the trained initial model, performing similar face retrieval in third training sample images to obtain two face images with similarity ranked in the top two, wherein the anchor face image is any one face image in the second training sample images;

determining a positive sample and a negative sample in the obtained two face images, wherein a similarity between the positive sample and the anchor face image is higher than a similarity between the negative sample and the anchor face image;

acquiring similar face features of all sample triplets based on the trained initial model, wherein each sample triplet comprises an anchor face image, and a positive sample and a negative sample of the anchor face image; and according to the obtained similar face features of the sample triplets, constructing the triplet loss function, and optimizing the triplet loss function by means of the stochastic gradient descent algorithm till convergence.

13. The storage medium according to claim 12, wherein a convergence condition of the triplet loss function is that a first distance is smaller than a second distance; wherein the first distance indicates a distance in feature space between a similar face feature of an anchor face image and a similar face feature of a positive sample in a same sample triplet, and the second distance indicates a distance in feature space between the similar face feature of the anchor face image and a similar face feature of a negative sample.

14. The storage medium according to claim 12, wherein a formula of the triplet loss function is:

$$\text{loss} = \max(0, \|f(x_a^i) - f(x_p^i)\|_2^2 + \text{margin} - \|f(x_a^i) - f(x_n^i)\|_2^2);$$

wherein loss refers to the triplet loss function, $\|f(x_a^i) - f(x_p^i)\|_2^2$ refers to an Euclidean distance between a similar face feature of an anchor face image and a similar face feature of a positive sample in a same sample triplet, $\|f(x_a^i) - f(x_n^i)\|_2^2$ refers to an Euclidean distance between the similar face feature of the anchor face image and a similar face feature of a negative sample in the same sample triplet, margin refers to a fixed minimum interval, and i is a positive integer.

* * * * *